(12) United States Patent
Brandle

(10) Patent No.: US 8,595,273 B2
(45) Date of Patent: Nov. 26, 2013

(54) HASH ALGORITHM USING RANDOMIZATION FUNCTION

(75) Inventor: Richard T. Brandle, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 11/626,403

(22) Filed: Jan. 24, 2007

(65) Prior Publication Data

US 2008/0177812 A1  Jul. 24, 2008

(51) Int. Cl.
*G06F 7/58*  (2006.01)
(52) U.S. Cl.
USPC ............................................ 708/250; 380/28
(58) Field of Classification Search
USPC ............................................ 708/250; 380/28
See application file for complete search history.

(56) References Cited

U.S. PATENT DOCUMENTS

| 4,418,275 | A | * | 11/1983 | Oosterbaan et al. | 377/33 |
| 5,608,801 | A | * | 3/1997 | Aiello et al. | 380/46 |
| 5,778,069 | A | * | 7/1998 | Thomlinson et al. | 380/262 |
| 2001/0031050 | A1 | * | 10/2001 | Domstedt et al. | 380/44 |
| 2002/0172359 | A1 | * | 11/2002 | Saarinen | 380/46 |
| 2003/0093649 | A1 | | 5/2003 | Hilton | 712/41 |
| 2004/0125799 | A1 | * | 7/2004 | Buer | 370/389 |
| 2004/0234074 | A1 | * | 11/2004 | Sprunk | 380/28 |
| 2006/0251250 | A1 | * | 11/2006 | Ruggiero et al. | 380/46 |

\* cited by examiner

*Primary Examiner* — Taghi Arani
*Assistant Examiner* — Tracy Mangialaschi
(74) *Attorney, Agent, or Firm* — Steven Chiu, Esq.; Blanche E. Schiller, Esq.; Heslin Rothenberg Farley & Mesiti P.C.

(57) ABSTRACT

A pseudo-random number generator is employed to provide the same results normally produced by hash functions. In particular, input character string data is employed to sequentially adjust the seed of a pseudo-random number generator to produce hash values.

20 Claims, 2 Drawing Sheets

HASH ALGORITHM USING RANDOMIZATION FUNCTION

TECHNICAL FIELD

The present invention relates in general to hash algorithms, and more particularly, to methods for generating hash values using pseudorandom number generators.

BACKGROUND OF THE INVENTION

There are many uses for hash functions which are deterministic functions designed to serve many purposes in the data processing arts. For example, they are used to determine if errors in transmission have occurred. They are used to provide an indication of whether or not data has been corrupted. They are also used in signature verification and for user identification.

The goal of any hash algorithm is to provide random and equal distribution of the hashed values over a specific range and be efficient in its execution. Most hash algorithms employ various forms of additive and rotative operations against the individual components of the value being hashed. In the case of character strings, this is usually an individual character.

Character strings are composed of the machines external character set and generally do not use the entire range of the machine alphabet. For example, EBCDIC and Extended ASCII use 256 characters in its alphabet but typically define less than 100 "printable" characters. In EBCDIC these are clustered in three of the four available 64 character quadrants. With extended ASCII these are tightly grouped in two of the four available 64 character quadrants Because of the clustering and grouping, hashing algorithms which process character strings show a "bit bias" in the generated values which the various additive and rotative techniques attempt to overcome but do not eliminate. Also, depending on the algorithm, character strings that use the same characters but in a different sequence can generate the same hash value. This increases the "collision rate" for different string values. That is, different strings generate the same hash value.

SUMMARY OF THE INVENTION

Like other hashing algorithms, this one processes each character of the string but instead of performing additive or rotative operations against the actual characters in the string, the character values are used to adjust the "seed" value sequence in a pseudo random number generator (PRNG). Very good and efficient pseudo random number generators are implemented in fewer than 10 machine instructions and easily provide 16, 32 or 64 bit pseudo random numbers. While PRNG systems are designed to produce bit strings that have random statistics, it is noted here that PRNGs are in fact deterministic devices.

The final hash value is set to zero and the PRNG seed is initialized to an initial value. For each character in the input string, the PRNG seed value is adjusted using the binary character of the input data. A call to the PRNG returns a new seed and a random number which is exclusive ORed into the final hash value. This process continues for the number of characters in the string. When all of the characters have been processed, the final hash value can be used directly or a modulo of the value can be taken to constrain the hash value to a specific value range. Since the random values are used to determine the hash value and not the characters themselves, the effects of printable character clustering within the total machine character set and character sequence are minimized.

The method of the present invention also includes an optional deterministic function whose input is the character value and whose output is used instead of the character itself to provide for seed adjustment.

Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
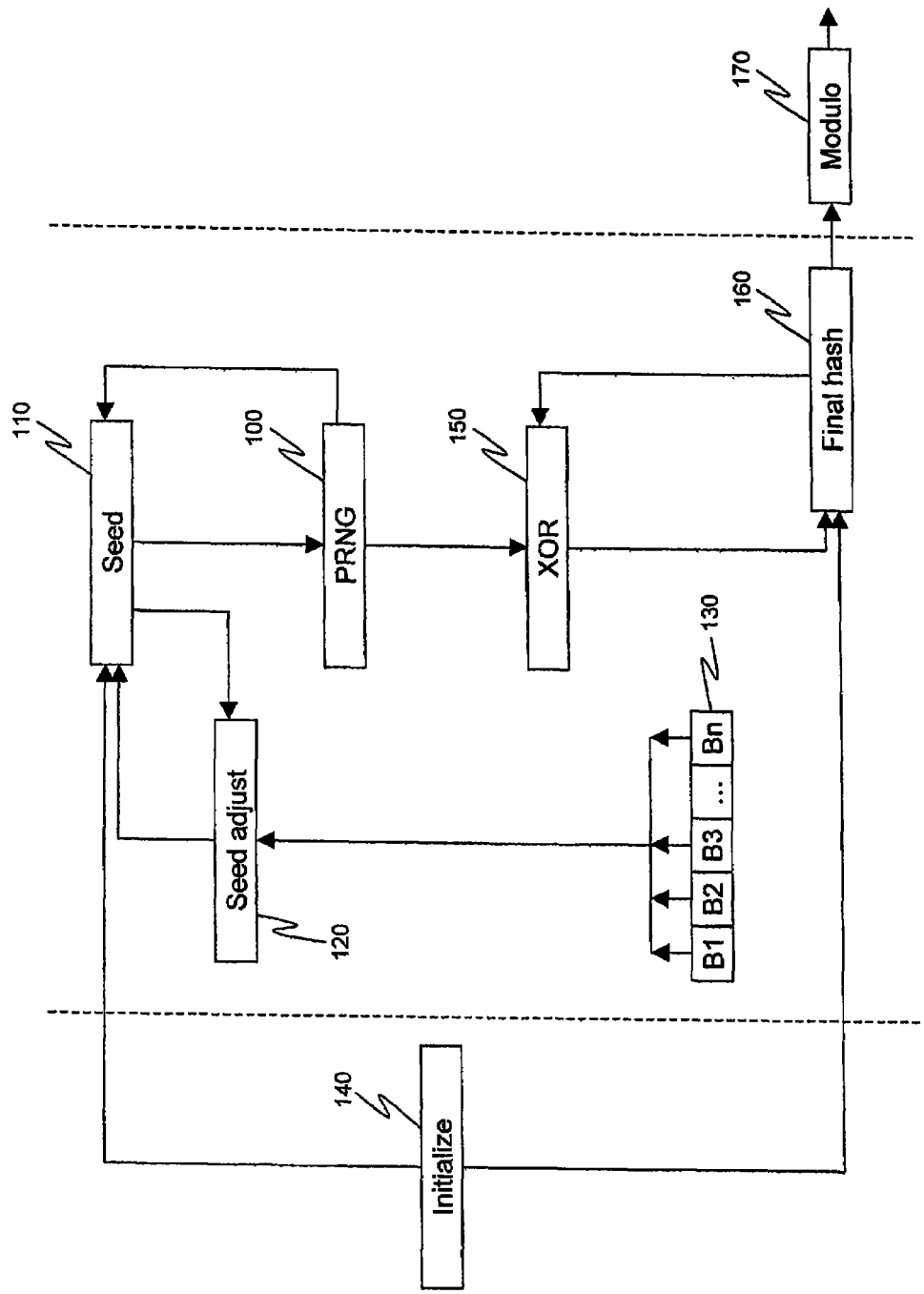
FIG. 1 is a block diagram illustrating the process of the present invention and in particular showing the processing of a character string to generate a hash value.

FIG. 1 illustrates one of the preferred embodiments of the present invention. In particular, FIG. 1 shows pseudorandom number generator 100, which generates pseudorandom numbers to be supplied to exclusive-OR block 150 based upon the seed value present in block 110. The beginning of the process starts with the initialization 140, which selects an initial seed value and an initial value for the final hash value to be placed in block 160. During each cycle of the process a value such as those labeled $B_1$ through $B_n$ in block 130 are used to adjust the current seed value in block 110 via the seed adjusting function provided in block 120. This adjustment can be a simple addition operation, though other adjusting functions may be employed as well, such as subtraction or multiplication. Based upon the value of the seed in block 110 pseudorandom number generator 100 generates a value, which is exclusive-Ored in block 150 with the contents found in block 160, which is the final hash value. The process is repeated for as many characters, n, as provided in the data. Furthermore, the final value produced from block 160 may be computed modulo N to provide a final hash value that lies within a convenient range. In short, in each cycle, the seed value is changed, and in particular, it is changed in accordance with adjustments made in block 120 based upon character values from block 130 that are supplied to it. The generated random number is then exclusive-ORed with the previous hash value to produce a new hash value.

As pointed out above, the output from exclusive-OR block 150 is supplied to block 160 representing the next desired hash value output. However, it is noted that the output from block 160 may be summed over a number n of input character cycles with the hash value output being a sequence of bits processed by block 170 in this manner.

The segment of code below in the C programming language provides one preferred implementation of the present invention. In particular, assume that the variable "name" points to a NULL terminated "C" style string. The implementation below uses the system provided "rand_r" function to generate the random number. The variable "newKey" will contain the hash value when all the characters in the string have been processed. The initial "seed" value is arbitrarily selected and changes with each call to the "rand_r" function:

```
newKey = 0;
seed = 7701;
for(; *name; ++name) {
   seed += (unsigned char)*name;
   newKey = newKey ^ rand_r(&seed);
}
```

One use for the Hashing algorithm is to manage the symbol table in the registry to track all the resources that are created by name. However, the hashing function is independent of the registry and can be used any time some type of name hash is needed to manage a set of named resources. For example, symbol table in a compiler, named files on a data volume, etc. The intent is to provide a more even distribution across the available hash space regardless of hash size. The ideal collision rate would be number-of-items/number-of-hash-entries. This hash is more dependent on the PRNG distribution than the actual values of the items being hashed, a characteristic which renders it ideal for the applications intended herein.

The present invention may be implemented in software or in firmware in a stored program digital data processing system. In such an event blocks such as 130, 110, and 160 are best interpreted as storage locations. Blocks 100, 120, 140, 150 and 170 are best interpreted as software encoded functions. However, the present invention may also be practiced by constructing the system shown in FIG. 1 as a plurality of components forming a dedicated signal processing device or as a programmed aspect of a programmable digital signal processing element.

Figure 3:
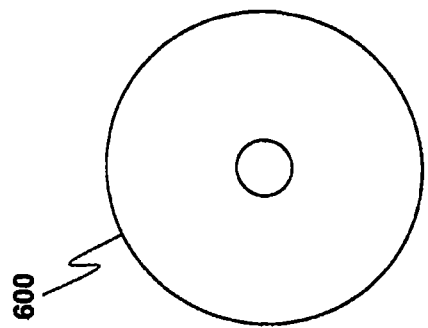
FIG. 3 is a top view of a CD-ROM or other computer readable medium on which the present invention is encoded.
Figure 2:
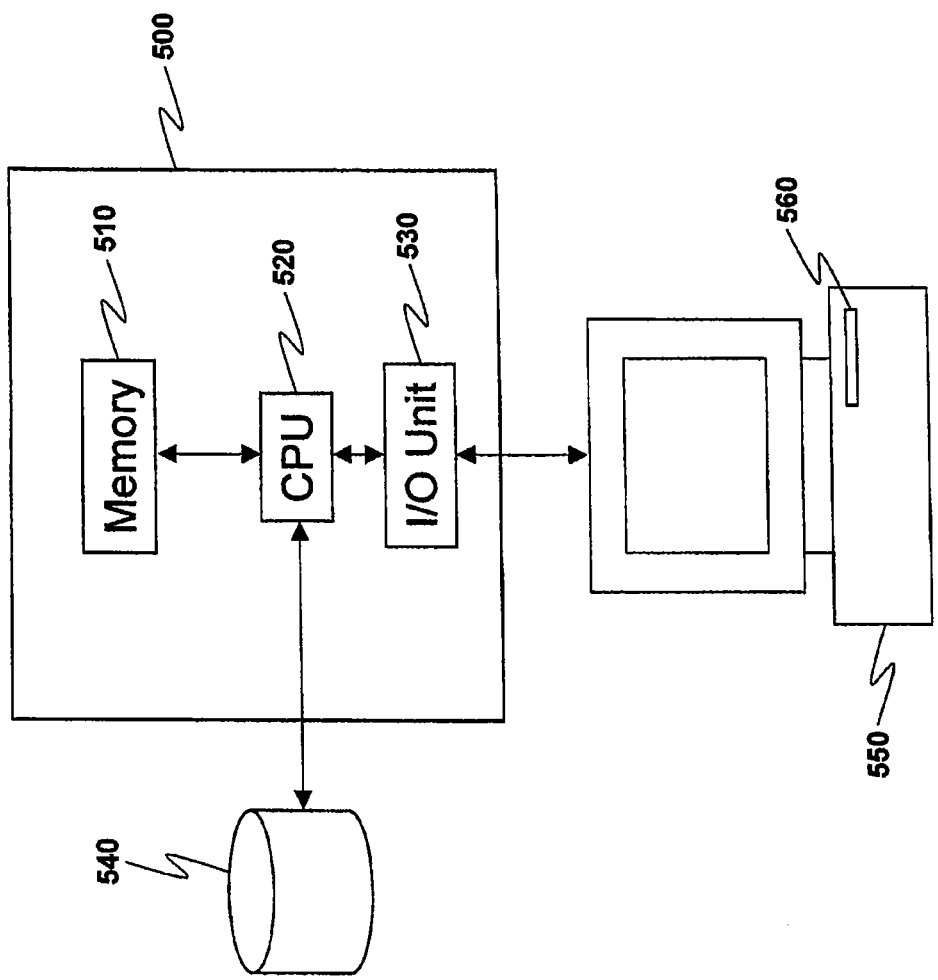
FIG. 2 is a block diagram illustrating the environment in which the present invention is employed.

In any event the environment in which the present invention operates is shown in FIG. 2. The present invention operates in a data processing environment which effectively includes one or more of the computer elements shown in FIG. 2. In particular, computer 500 includes central processing unit (CPU) 520 which accesses programs and data stored within random access memory 510. Memory 510 is typically volatile in nature and accordingly such systems are provided with nonvolatile memory typically in the form of rotatable magnetic memory 540. While memory 540 is preferably a nonvolatile magnetic device, other media may be employed. CPU 530 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein a device 560 for reading medium of one or more types such as CD-ROM 600 shown in FIG. 3. Media 600 may also comprise any convenient device including, but not limited to, magnetic media, optical storage devices and chips such as flash memory devices or so-called thumb drives. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for generating a hash function value for input data, said computer program product comprising:
a non-transitory computer readable storage medium readable by a processor and storing instructions for execution by the processor for performing a method comprising:
selecting a character of the input data;
adjusting a seed value based on a value of the character to provide an adjusted seed value;
inputting the adjusted seed value directly to a pseudo-random number generator to obtain a direct output of the pseudo-random number generator;
performing a logical operation on the direct output of the pseudo-random number generator and a hash value, the direct output of the pseudo-random number generator being provided as a direct input to the logical operation, the hash value being a direct input to the logical operation and a separate input from the input to the logical operation provided by the output of the pseudo-random number generator, to obtain a new hash value, the obtained new hash value being directly output from the logical operation; and
repeating for one or more other characters of the input data the selecting, the adjusting, the inputting and the performing, wherein the repeating the performing comprises inputting the obtained new hash value, directly output from the logical operation, as a direct input to the logical operation absent modification by logical operation to the obtained new hash value after being output from the logical operation and directly input into the logical operation, and using the obtained new hash value as the hash value on which the logical operation is performed, and wherein in response to the repeating, a final hash value is obtained, wherein use of the pseudo-random number generator to obtain the final hash value facilitates providing a substantially even distribution of hash values across an available hash space.

2. The computer program product of claim 1, wherein the adjusting comprises adding said value of said character, treated as a number represented by a sequence of bits, to the seed value to provide the adjusted seed value.

3. The computer program product of claim 1, wherein said performing the logical operation comprises performing an exclusive-OR of the direct output of said pseudo-random number generator with the hash value to obtain the new hash value.

4. The computer program product of claim 1, wherein the one or more other characters comprises each character of the input data.

5. The computer program product of claim 1, wherein said method further comprises adding n consecutive output values of the performing to obtain the final hash value.

6. The computer program product of claim 1, wherein the method further comprises performing a modulo operation of the final hash value to constrain the final hash value to a specific value range.

7. The computer program product of claim 1, wherein the repeating the adjusting comprises obtaining a new seed value as an output of the pseudo-random number generator, and adjusting the new seed value based on a value of a next character of the one or more other characters to provide a new adjusted seed value which is directly input to the pseudo-random number generator in repeating the inputting.

8. A computer system for generating a hash function value for input data, the computer system comprising:
 a memory; and
 a processor in communication with the memory, wherein the computer system is capable of performing a method, said method comprising:
 selecting a character of the input data;
 adjusting a seed value based on a value of the character to provide an adjusted seed value;
 inputting the adjusted seed value directly to a pseudo-random number generator to obtain a direct output of the pseudo-random number generator;
 performing a logical operation on the direct output of the pseudo-random number generator and a hash value, the direct output of the pseudo-random number generator being provided as a direct input to the logical operation, the hash value being a direct input to the logical operation and a separate input from the input to the logical operation provided by the output of the pseudo-random number generator, to obtain a new hash value, the obtained new hash value being directly output from the logical operation; and
 repeating for one or more other characters of the input data the selecting, the adjusting, the inputting and the performing, wherein the repeating the performing comprises inputting the obtained new hash value, directly output from the logical operation, as a direct input to the logical operation absent modification by logical operation to the obtained new hash value after being output from the logical operation and directly input into the logical operation, and using the obtained new hash value as the hash value on which the logical operation is performed, and wherein in response to the repeating, a final hash value is obtained, wherein use of the pseudo-random number generator to obtain the final hash value facilitates providing a substantially even distribution of hash values across an available hash space.

9. The computer system of claim 8, wherein the adjusting comprises adding said value of said character, treated as a number represented by a sequence of bits, to the seed value to provide the adjusted seed value.

10. The computer system of claim 8, wherein said performing the logical operation comprises performing an exclusive-OR of the direct output of said pseudo-random number generator with the hash value to obtain the new hash value.

11. The computer system of claim 8, wherein the one or more other characters comprises each character of the input data.

12. The computer system of claim 8, wherein said method further comprises adding n consecutive output values of the performing to obtain the final hash value.

13. The computer system of claim 8, wherein the method further comprises performing a modulo operation of the final hash value to constrain the final hash value to a specific value range.

14. The computer system of claim 8, wherein the repeating the adjusting comprises obtaining a new seed value as an output of the pseudo-random number generator, and adjusting the new seed value based on a value of a next character of the one or more other characters to provide a new adjusted seed value which is directly input to the pseudo-random number generator in repeating the inputting.

15. A method for generating a hash function value for input data, said method comprising:
 selecting, by a central processing unit, a character of the input data;
 adjusting, by the central processing unit, a seed value based on a value of the character to provide an adjusted seed value;
 inputting the adjusted seed value directly to a pseudo-random number generator to obtain a direct output of the pseudo-random number generator;
 performing a logical operation on the direct output of the pseudo-random number generator and a hash value, the direct output of the pseudo-random number generator being provided as a direct input to the logical operation, the hash value being a direct input to the logical operation and a separate input from the input to the logical operation provided by the output of the pseudo-random number generator, to obtain a new hash value, the obtained new hash value being directly output from the logical operation; and
 repeating for one or more other characters of the input data the selecting, the adjusting, the inputting and the performing, wherein the repeating the performing comprises inputting the obtained new hash value, directly output from the logical operation, as a direct input to the logical operation absent modification by logical operation to the obtained new hash value after being output from the logical operation and directly input into the logical operation, and using the obtained new hash value as the hash value on which the logical operation is performed, and wherein in response to the repeating, a final hash value is obtained, wherein use of the pseudo-random number generator to obtain the final hash value facilitates providing a substantially even distribution of hash values across an available hash space.

16. The method of claim 15, wherein the adjusting comprises adding said value of said character, treated as a number represented by a sequence of bits, to the seed value to provide the adjusted seed value.

17. The method of claim 15, wherein said performing the logical operation comprises performing an exclusive-OR of the direct output of said pseudo-random number generator with the hash value to obtain the new hash value.

18. The method of claim 15, further comprising adding n consecutive output values of the performing to obtain the final hash value.

19. The method of claim 15, further comprising performing a modulo operation of the final hash value to constrain the final hash value to a specific value range.

20. The method of claim 15, wherein the repeating the adjusting comprises obtaining a new seed value as an output of the pseudo-random number generator, and adjusting the new seed value based on a value of a next character of the one or more other characters to provide a new adjusted seed value which is directly input to the pseudo-random number generator in repeating the inputting.

* * * * *